United States Patent [19]

Lietz et al.

[11] 4,116,903

[45] Sep. 26, 1978

[54] ALKYD-SUPPORTED EMULSION INTERPOLYMERS AND METHODS FOR PREPARATION

[75] Inventors: Dennis E. Lietz, Western Springs; Layton F. Kinney, Chicago, both of Ill.

[73] Assignee: P.R.A. Laboratories Incorporated, Chicago, Ill.

[21] Appl. No.: 773,547

[22] Filed: Mar. 2, 1977

[51] Int. Cl.² .................... C09D 3/66; C09D 5/02
[52] U.S. Cl. .................... 260/22 CB; 260/23 P; 260/29.2 E; 260/29.2 UA; 260/29.6 NR; 428/431
[58] Field of Search ............ 260/29.6 NR, 22 CB, 260/29.2 E, 23 P, 29.2 UA; 428/431

[56] References Cited

U.S. PATENT DOCUMENTS

| | | | |
|---|---|---|---|
| 2,295,699 | 9/1942 | Thackston | 260/29.2 UA |
| 2,443,735 | 6/1948 | Kropa | 260/29.2 UA |
| 2,586,092 | 2/1952 | Robinson | 260/22 RU |
| 2,843,556 | 7/1958 | Moorman | 260/29.6 NR |
| 2,884,404 | 4/1959 | Parker | 260/29.2 UA |
| 3,001,961 | 9/1961 | Armitage et al. | 260/22 CB |
| 3,224,992 | 12/1965 | Stephens | 260/29.6 NR |
| 3,306,866 | 2/1967 | Percival et al. | 260/29.6 NR |
| 3,547,846 | 12/1970 | Coulter | 260/21 |
| 3,620,989 | 11/1971 | Cummings | 260/22 CB |
| 3,629,169 | 12/1971 | Bedighian | 260/29.6 NR |
| 3,634,351 | 1/1972 | Kimura et al. | 260/22 CB |
| 3,681,108 | 8/1972 | Lewis et al. | 260/29.6 NR |
| 3,692,724 | 9/1972 | Van Dyk | 260/29.6 NR |
| 3,726,509 | 4/1973 | Lammers et al. | 260/29.6 NR |
| 3,822,224 | 7/1974 | Gillan et al. | 260/29.6 NR |
| 3,862,075 | 1/1975 | Sekmakas | 260/29.4 UA |
| 3,926,888 | 12/1975 | Cheung et al. | 260/29.4 UA |
| 3,928,273 | 12/1975 | Chang et al. | 260/29.4 UA |
| 3,970,628 | 7/1976 | Connelly et al. | 260/29.4 UA |
| 3,979,342 | 9/1976 | Baidins et al. | 260/29.6 NR |

FOREIGN PATENT DOCUMENTS

| | | |
|---|---|---|
| 123,732/75 | 9/1975 | Japan. |
| 123,734/75 | 9/1975 | Japan. |
| 11,947/75 | 5/1975 | Japan. |

*Primary Examiner*—Ronald W. Griffin
*Attorney, Agent, or Firm*—Hill, Gross, Simpson, Van Santen, Steadman, Chiara & Simpson

[57] ABSTRACT

Neutralized, aqueous solutions of alkyd resins are used as the sole emulsifiers to stabilize emulsion polymers formed using vinyl monomers. A product emulsion system contains on a 100 weight percent total system non-volatile solids basis typically from about 25–50 weight percent alkyd resin with the balance being in situ emulsion polymerized vinyl monomers. Product emulsion systems are storage stable and can be coated or cast to form clear films, and paints formulated therefrom can display excellent gloss, leveling and water resistance qualities.

51 Claims, No Drawings

ALKYD-SUPPORTED EMULSION INTERPOLYMERS AND METHODS FOR PREPARATION

BACKGROUND OF THE INVENTION

In the art of emulsions adapted to form films and coatings, mixed polymer and interpolymer emulsions utilizing an alkyd resin have heretofore been prepared typically by following either one of two different procedures. By one procedure, separately formed but compatible dispersions or solutions of, respectively, an alkyd resin on the one hand, and a compatible emulsion of polymerized vinyl monomer on the other hand are simply admixed together. By the other procedure, a preformed solution or dispersion of alkyd resin has incorporated thereinto an appropriate emulsifier and then selected vinyl monomers are added thereto and emulsion polymerized in situ so as to provide an interpolymer system.

Regardless of the method of preparation, to prepare a paint, the resulting emulsion system is typically additionally formulated with pigments, curing agents, perhaps additional emulsifiers, and other additives, so that the product system is typically a complex system in which the various components are carefully and even critically balanced against one another in type and quantity so as to provide commercially acceptable latex paints. Such a paint suffers from various disadvantages. For one thing, the very complexity of such conventional prior art paint systems is disadvantageous from a cost of preparation standpoint. For another thing, the presence of an emulsifier in a product painted surface prepared from such an emulsion system is usually subject to problems, such as disadvantages arising from retained water sensitivity of the dried films, as manifested, for example, in water spotting, in leaching of the emulsifiers when films are sprinkled with water, with subsequent film streaking, and in reduced film water and scrub resistance. Ideally, the art would like to have stable emulsions which combine the advantages of alkyd resins and of emulsion polymerized vinyl-type monomers without using conventional emulsifiers and which produce improved coating characteristics.

Herefore, an effort has been made to disperse a pigment in an alkyd resin dispersion so as to form a paint and then to polymerize in situ vinyl monomers in this paint. This procedure of prepigmenting has generally not been commercially promising because, as the quantity of pigment is increased to levels commonly employed in commercial paints, the ability to conduct emulsion polymerization in the resulting prepigmented alkyd system decreases. In such prepigmented system, the choice of components is apparently critical so that only a limited variation in components and reactants is possible in a system at the time of vinyl monomer emulsion polymerization. Also, in such a prepigmented system, the resulting system after polymerization of vinyl monomer therein appears to have relatively poor stability characteristics.

So far as is known, no one in the art has ever heretofore prepared interpolymer emulsions comprising a preformed alkyd resin and in situ polymerized vinyl monomers without using a conventional emulsifier.

BRIEF SUMMARY OF THE INVENTION

The present invention avoids the above indicated disadvantages with emulsion interpolymer systems. The present invention, more specifically, concerns storage stable, pourable emulsion systems produced by the emulsion polymerization of vinyl monomers in the presence of dissolved alkyd resins without the use of conventional emulsifiers, and to processes for producing the same. Also, the present invention concerns the coating and film forming compositions produced using such interpolymer emulsion systems, and, in addition, the films and coatings resulting from the use thereof.

In one aspect, the present invention avoids the use of emulsifiers in alkyd containing emulsion interpolymer systems, thereby avoiding the problems and disadvantages associated with the use and presence thereof, particularly in product coatings and films.

In another aspect, the present invention provides new and useful emulsion interpolymer systems having formulation capabilities heretofore unknown in this art; for example, white paints with pigment to binder ratios of at least 40 to 60 based upon vehicles of the present invention can be formulated which when cured at room temperature have gloss levels that are higher than those attainable with vinyl polymer emulsions heretofore known.

In another aspect, the present invention provides improved, simple, storage stable emulsion compositions.

In another aspect, the present invention provides new and improved coatings and films with unexpected and surprising gloss, flow, and curing potential.

In another aspect, this invention provides a technique for making mixed alkyd resin vinyl polymer systems wherein one can achieve greater than 90 weight percent conversion of starting vinyl monomer by in situ polymerization of vinyl monomer in the presence of starting alkyd resin.

Other and further objects, aims, features, purposes, advantages, utilities, aspects, and the like will be apparent to those skilled in the art from the present teachings.

DETAILED DESCRIPTION

The starting alkyd resins

The starting alkyd resins employed in the present invention generally are water-soluble preformed (i.e., are made before in situ vinyl monomer emulsion polymerization as taught by this invention) polymeric ester resins which are each free from unsaturated dibasic acid material selected from the group consisting of maleic acid, maleic anhydride, fumaric acid, and itaconic acid. Such resins are derived from the esterification of from about 20 to 60 weight percent of at least one species of polybasic acid material, with from about 20 to 60 weight percent at least one species of polyhydric alcohol, and, also from 0 to about 65 weight percent of at least one species of reactable, carboxyl group containing compound selected from the group consisting of oily esters and monobasic acids, all as explained herein.

Since relative weight percentages of individual such components in any given starting alkyd resin can vary widely, it appears desirable and correct for purposes of fully characterizing starting alkyd resins for the present invention, to generically describe such in terms of their properties. Thus, in general, the water soluble alkyd resins used in the practice of this invention are characterized by having (1) hydroxyl values ranging from 1 to about 200, (b) acid numbers ranging from about 10 to 100, and (c) molecular weights ranging from about 1,000 to 5,000.

By the term "water soluble" as used herein in reference to a material, such as a starting alkyd resin, or a curing agent, as employed in this invention, is meant the ability when neutralized to dissolve or disperse in water, or in water containing up to 50 weight percent of a water miscible organic solvent, to form a solution (including dispersion) ranging from a clear liquid mass to a colloidal dispersion of particles of up to about 1 micron in size. Preferred starting alkyd resins as used in starting solutions produce solutions or dispersions which are stable at room temperature for periods of time of at least about one month.

Preferred hydroxyl values for starting alkyd resins fall in the range from about 30 to 60. Hydroxyl values may be determined for purposes of this invention by using ASTM test procedure No. D-1957; alternatively, such values may be calculated based on excess of hydroxyl functionality over carboxyl functionality as those skilled in the art will appreciate.

Preferred acid numbers for starting alkyd resins fall in the range of about 40 to 100, and, more preferably, in the range from about 50 to 70. Acid numbers may be determined for purposes of this invention by titration of a resin with from 0.1 to 1.5 normal potassium hydroxide. "Acid number" is defined as milligrams of potassium hydroxide needed to neutralize fully to a phenolphthalein end point one gram of alkyd solids.

Preferred molecular weights range from about 2000 to 3000. Molecular weights may be determined for purposes of this invention by vapor pressure osmometry and/or gel permeation chromatography.

Such starting alkyd resins, and methods for their preparation, are believed known to the prior art, and, therefore, such do not as such constitute the present invention.

Suitable polyhydric alcohols for use in starting alkyd resins include those having at least 2 carbon atoms per molecule and also having 2 to 6 hydroxyl groups per molecule. Examples include glycerin, pentaerythritol, trimethylolpropane, trimethyl pentane diol, trimethylolethane, dipentaerythritol, ethylene glycol, propylene glycol, 1,3-butylene glycol, neopentyl glycol, hydrogenated bisphenol A, 2,2-dimethyl-3-hydroxy propyl-2,2-dimethyl-3-hydroxy propionate, dimethylolpropionic acid, polyethylene glycols having molecular weights ranging from about 200 to 6000, and the like. Presently preferred polyhydric alcohols are trimethylolpropane and trimethylolethane.

Suitable polybasic acid materials for use in starting alkyd resins include saturated and aromatically unsaturated polycarboxylic acids and anhydrides thereof (including dicarboxylic species) each having from 3 to 36 carbon atoms per molecule and each having at least two carboxyl groups per molecule. Examples include aliphatic and aromatic (preferred) species, such as malonic, glutaric, pimelic, suberic, azelaic, sebacic, succinic, adipic, phthalic (including anhydride) isophthalic, terephthalic, trimellitic anhydride, tricarballylic, 3,3′,4,4′-benzophenone tetracarboxylic acid dianhydride, 1,1,3-trimethyl-5-carboxy (p-carboxyphenyl) indan, lower alkyl substituted phthalic acids, tetrahydrophthalic acid, dimerized fatty acids and the like. The term "lower" as used herein has reference to less than 7 carbon atoms per alkyl group. Presently preferred polybasic acid materials are phthalic anhydride, isophthalic acid, and trimellitic anhydride.

Suitable oily esters used or usable in the starting alkyd resins employed in this invention are esters of long chain carboxylic acids containing at least 6 carbon atoms per molecule with polyhydric alcohols having at least 3 carbon atoms per molecule. One preferred class of such oils comprises triglycerides of monocarboxylic fatty acids, whether saturated or not, particularly those which can absorb oxygen and thereby thicken and perhaps even become resinous solids. In general, any of the triglyceride oils conventionally used in the alkyd resin art can be here employed. Usually such serve to introduce unsaturation into a starting alkyd resin utilized in this invention. Typical examples include glycerides of linoleic and linolenic acids, and similar glycerides, such as linseed oil, soybean oil, dehydrated castor oil, tung oil, safflower oil, sunflower oil, and the like. Other suitable triglyceride oils include coconut oil, palm oil, rapeseed oil, certain animal and fish oils, such as whale oil, menhaden oil, sardine oil, and the like. Synthetic oily esters comprised of fatty acids esterified with pentaerythritol can be used. Glycidyl esters such as Cardura E can also be used. Presently preferred drying oils are soybean and safflower oils. The exact amount of such oily ester used in any given starting alkyd resin can vary, being influenced by the intended or anticipated end use for a product of this invention.

Suitable monobasic acids used or usable in the starting alkyd resins employed in this invention contain from about 6 to 22 carbon atoms per molecule and one carboxyl group per molecule. Examples include fatty acids derived from one or more of the aforementioned oily esters, tall oil, synthetic conjugated carboxylic fatty acids, Pamolyn 200 and Pamolyn 240 (which are believed to be primarily partially conjugated linoleic, linolenic, and oleic acid mixtures and which are available commercially from Hercules, Inc.), and the like.

In addition to the above, a starting alkyd resin can have incorporated thereinto other functional materials known to those skilled in the alkyd resin art, typically in amounts not more than about 5–15 weight percent, based on total starting alkyd resin weight, such as benzoic acid, p-tertiary butylbenzoic, abietic acid, 1-pimaric acid, rosin, phenol-formaldehyde resole resins, and the like.

One preferred class of such starting alkyd resins comprises the following materials in the respective ranges indicated (total 100% weight basis).

| Material | Approx. Weight percent |
| --- | --- |
| Triglyceride oil ester and/or monobasic acid | 25–60 |
| Polyhydric alcohol (containing 2-6 hydroxyl groups/mol.) | 15–35 |
| Dicarboxylic acid or dicarboxylic acid anhydride | 25–34 |
| Tricarboxylic acid | 0–12 |

As those skilled in the art will appreciate, the starting alkyd resins used in this invention can be prepared by any convenient or conventional technique. For example, such resins can be produced by the direct fusion of polybasic acid material, polyhydric alcohol, and, if present, monobasic acids, at temperatures ranging from about 410° to 475° F. Alternatively, the alcoholysis method starting with triglyceride oil may be employed. By either such route, a product alkyd resin may be neutralized at least partially, after the desired degree of esterification is attained. Water miscible organic liquids and/or water may be added to a suitably cooled such reaction product to adjust the solids content thereof to some desired level.

The starting aqueous alkyd resin solutions

A starting aqueous alkyd resin solution comprises from about 10 to 60 weight percent of at least one dissolved alkyd resin (as characterized above), sufficient base to neutralize such solution to a pH ranging from about 6 to 9, and the balance up to 100 weight percent of any given such sulution comprising water. Preferably, such a resin solution contains from about 15 to 25 weight percent (same basis) of such dissolved alkyd resin.

In addition to water, such a starting aqueous resin solution can additionally incorporate optionally various other inert, liquid materials. Thus, such a starting solution can contain up to about 50 weight percent (based on total starting aqueous alkyd resin solution) of an organic solvent-type liquid compound which is dissolved in (i.e., is miscible with) water. Preferably such organic compound has a molecular weight under about 200. Examples of such materials include butoxyethanol, butoxyethoxyethanol, and the like. One especially preferred class of such water miscible organic solvents comprises coalescing solvents by which reference is had to organic media which tend to induce film formation of a polymer system at temperatures below the glass transition temperature of that polymer system. Typical of coalescing solvents is butoxyethoxyethanol. Preferably and typically, such a starting solution contains from about 5 to 25 weight percent of at least one such water miscible organic solvent (based on total starting aqueous alkyd resin solution). The use of coalescing solvent is surprisingly effective.

As indicated, a starting aqueous alkyd resin solution used in this invention is characterized by the fact that the dissolved alkyd resin therein has been neutralized with at least one base, such as with a base selected from the group consisting of ammonium hydroxide, lower alkyl amines, cycloalkylamines, lower alkanol amines, heterocyclic amines, and alkali metal hydroxides, and the like. Examples of suitable lower alkyl amines include diethylamine, triethylamine, diisobutylamine, diisopropylamine, tributyl amine, and the like. Examples of suitable lower alkanolamines include 2 amino-2-methyl-1-propanol, dimethyl-aminomethyl propanol, ethanolamine, diethanolamine, triethanolamine, N,N-dimethyl ethanolamine, N-methyl diethanolamine, and the like. Examples of suitable heterocyclic amines include morpholine, N-methyl-morpholine, and the like. Examples of alkali metal hydroxides include hydroxides of sodium, potassium, lithium, and the like. Aqueous ammonium hydroxides and other bases may be used in any convenient concentration, including 28 weight %-$NH_3$ solutions, for example.

The preferred neutralizing agents for room temperature drying are triethylamine and ammonium hydroxide (especially preferred). Preferred neutralizing agents for thermally curable systems are dimethylethanol amine and dimethylaminomethyl propanol.

The greatest water resistance characteristics in a room temperature dried film or coating made using a product latex of this invention appears to be obtained with ammonium hydroxide.

The starting vinyl monomers

Vinyl monomers used as starting materials in the practice of this invention characteristically have molecular weights ranging from about 50 to 360 (and preferably from about 53 to 142), though larger and smaller molecular weight vinyl monomers can be employed, as those skilled in the art will appreciate. Such a monomer characteristically contains at least one ethylenically unsaturated group per molecule and is polymerizable through such an ethylenically unsaturated group under aqueous liquid phase conditions in the presence of a free radical initiator. More than one monomer may be used at any given time in making a product of this invention.

Examples of suitable vinyl monomers include vinylidene chloride; arylalkenes, such as styrene, vinyl toluene, alpha-methyl styrene, dichlorostyrene, and the like; lower alkyl acrylates, such as methyl acrylate, butyl acrylate, and the like; lower alkyl methacrylates, such as methyl methacrylate, butyl methacrylate, and the like; hydroxy lower alkyl acrylates, such as hydroxy propyl acrylate, hydroxy ethyl acrylate, and the like; hydroxy lower alkyl methacrylates, such as hydroxy ethyl methacrylate, hydroxy propyl methacrylate, and the like; amino lower alkyl methacrylates, such as N,N-dimethyl-amino ethyl methacrylate; amino lower alkyl acrylates, such as N,N dimethyl-amino ethyl acrylate; lower alkenyl nitriles, such as acrylonitrile, methacrylonitrile, and the like; lower alkenyl carboxylic acids, such as acrylic acid, methacrylic acid, and the like; lower alkenyl amides, such as acrylamide, methacrylamide, isobutoxymethylacrylamide, and the like; lower hydroxyalkyl alkenyl amides, such as hydroxy methyl acrylamide, and the like; lower alkyl butenedioates such as dibutyl maleate, dibutyl fumarate, and the like; vinyl lower alkenoates, such as vinyl acetate, and vinyl propionate, and the like; etc.

Presently preferred vinyl monomers include styrene, butyl acrylate, methyl methacrylate, hydroxyethyl acrylate, and hydroxyethyl methacrylate.

As those skilled in the art will appreciate, an inhibitor is typically present in a starting vinyl monomer as available commercially from a monomer manufacturer so as to prevent any undesirable or excessive premature polymerization or gellation of the starting monomer. The amount of inhibitor present is commonly in the range from about 5 to 1000 parts per million (total starting vinyl monomer weight basis). Many suitable inhibitors are known to the art; examples include hydroquinone, methyl hydroquinone, t-butyl catechol, and the like. Inhibitors characteristically appear to be inert and substantially not functional so far as the present invention is concerned.

The initiators

In order to cause vinyl monomer to polymerize in the presence of the dissolved alkyd resin by emulsion polymerization, at least one free radical initiator is introduced into a starting alkyd resin aqueous solution before or during addition thereto, with agitation, of such vinyl monomer. Such initiators are theorized to decompose into highly active free radicals which act to seed the free radical polymerization reactions believed involved, though there is no intent herein to be bound by theory. As used herein, the term "initiator" or "free radical initiator" has reference to a substance which when added to a starting alkyd resin aqueous solution appears to promote addition polymerization. The amount of initiator used in any given situation typically ranges from about 0.1 to 5 parts per 100 parts by weight of total vinyl monomer added to a starting alkyd resin solution, and preferably from about 0.5 to 2 parts per 100 parts total vinyl monomer, but larger or smaller amounts may be used, as known to those skilled in the art.

A preferred class of initiators comprises persulfates, such as potassium persulfate, sodium persulfate, ammonium persulfate, and the like.

Another class of initiators comprises percarbonates, such as dissopropyl percarbonate, and the like.

Another class of suitable initiators comprises peroxides. One group of suitable peroxides comprises diacyl peroxides, such as benzoyl peroxide, lauroyl peroxide, 2,4-dichloro benzoyl peroxide, p-chlorobenzoyl peroxide, and the like. Another group comprises ketone peroxides, such as methyl ethyl ketone peroxide and the like. Another group comprises alkyl peresters such as di-t-butyl perphthalate, t-butyl perbenzoate, and the like. Another group comprises alkyl hydroperoxides such as t-butyl hydroperoxide, and the like. Another group comprises aqueous hydrogen peroxides.

Generally the initiator is chosen with a half life such that an effective amount is present during the polymerization to insure complete reaction. Preferred initiators comprise those which are virtually completely consumed when a polymerization is complete.

Certain other classes of materials can be present at the time of, or during such an emulsion polymerization, such as chain transfer agents such as n-octylmercaptan, and t-dodecyl mercaptan; reducing agents, such as sodium bisulfite, sodium formaldehyde sulfoxylate, sodium hydrosulfite, and sodium thiosulfate, and like agents. The amount of such agents or additives if such are used is characteristically less than about five weight percent based on total solids present in a reaction system. Such additives are known to those skilled in the art of vinyl monomer emulsion polymerization.

Emulsion Polymerization Conditions

In general, in situ emulsion polymerization of vinyl monomers in the presence of dissolved alkyd resin in accordance with the teachings of this invention proceeds under liquid phase conditions at temperatures in the range from about 25° to 95° C., and preferably in the range of from about 50° to 80° C. Polymerization times are variable, depending upon starting materials, conditions, and the like; typical reaction times and monomer addition rates range from about 1 to 3 hours, but longer and shorter times are common.

In making an emulsion one starts with a solution comprising initially on a 100 weight percent total weight basis from about 10 to 60 weight percent of at least one dissolved alkyd resin which is free from unsaturated dibasic acid material selected from the group consisting of maleic acid, maleic anhydride, fumaric acid, and itaconic acid, sufficient base to neutralize such solution to a pH ranging from 6 to 9, and the balance up to 100 weight percent of any given such solution comprising water and optionally at least one water miscible solvent which is present in an amount up to about 50 weight percent based on total starting aqueous alkyd resin solution. In such solution one adds at least one vinyl monomer in the presence of an initiator (as described above). One forms an emulsion polymer in situ. The total amount of vinyl monomer so added is sufficient to produce from about 10 to 65 weight percent of emulsion polymer in the resulting aqueous system. The emulsion polymer as formed is stabilized by such alkyd resin.

The rate of monomer polymerization is controlled not only by temperature, but also by such variables as the amount and type of initiators used, the concentration of alkyd resin in the solution as well as the type of alkyd resin involved, and by other factors.

In making a product emulsion of this invention, one preferably adds the vinyl monomer to a starting alkyd resin solution gradually or incrementally at a rate such that the exothermic polymerization can be controlled adequately. Under favorable circumstances such as controllable exotherm, the monomers can be added in bulk. Monomers may consist of single or mixed monomer systems.

For example, one embodiment of such a process for making an emulsion of this invention involves the addition while agitating of at least one vinyl monomer to an aqueous system. This aqueous system comprises initially on a 100 weight percent total weight basis:

(A) from about 15 to 25 weight percent of a preformed alkyd resin as identified above which has been preneutralized to a starting aqueous alkyd resin solution pH ranging from about 6 to 9,
(B) sufficient base to so neutralize such solution to such pH range,
(C) from about 0.1 to 5 weight percent of a dissolved vinyl monomer polymerization initiator, and
(D) from about 40 to 90 weight percent water and optionally at least one water miscible solvent which is present in an amount up to about 50 weight percent based on total starting aqueous alkyd resin solution.

This addition is carried out while maintaining the temperature of this aqueous system in the range from about 50° to 80° C. A latex polymer forms. The total amount of such vinyl monomer so added is sufficient to produce from about 15 to 50 weight percent of emulsion polymer in the resulting such aqueous system. This emulsion polymer as formed is stabilized by said alkyd resin.

In one preferred such process embodiment, the vinyl monomer so added comprises, on a 100 weight percent total weight basis, from about 90 to 100 weight percent styrene, and from 0 to about 10 weight percent hydroxyethyl acrylate. In another preferred such process embodiment the vinyl monomer so added comprises on a 100 weight percent total weight basis from about 50 to 70 weight percent butyl acrylate,
from about 30 to 40 weight percent methyl methacrylate, and
from 0 to about 10 weight percent hydroxyethyl methacrylate.

Typically, in such process embodiment, such initial aqueous system contains at least one water miscible organic liquid which can be present in an amount up to about 30 weight percent (based on total carrier liquid). With the possible exception of certain monomers like vinyl acetate, the emulsion polymerization of vinyl monomers in the presence of alkyd resin as taught by the present invention surprisingly results in conversions which are characteristically above about 90% (based on total starting monomer, and preferably above about 95% (same basis)). Typically, these systems contain up to 50 weight percent of at least one water miscible organic liquid based on total carrier liquid; if desired, such water miscible organic liquid can be added to a product emulsion after formation as described above.

Product Emulsions

Emulsions of this invention produced as described above are characteristically storage stable and pourable. They are also characteristically film forming at ambient and/or elevated temperatures, and, also, they are characteristically substantially free from coagulum.

By the term "storage stable", reference is had to substantially complete absence of significant change in physical properties during 6 months storage at room temperature.

By the term "film forming", reference is had to a capability of forming a continuous and cohesive film at ambient temperature.

Such an emulsion product comprises on a 100 weight percent total weight basis from about 10 to 65 weight percent (preferably from about 15 to 50 weight percent) of an interpolymer system, with the balance up to 100 weight percent thereof being a carrier liquid. Such an interpolymer system itself comprises on a 100 weight percent total non-volatile resin solids basis from about 5 to 90 weight percent (preferably from about 15 to 50 weight percent) of a preformed, water-soluble alkyd resin of a type such as defined above which has been pre-neutralized (that is, before in situ vinyl monomer emulsion polymerization) with such base materials as described above to a starting aqueous alkyd resin solution pH ranging from about 6 to 9, with the balance up to 100 weight percent thereof being at least one in situ emulsion polymerized vinyl monomer.

The carrier liquid comprises on a 100 weight percent total carrier liquid basis from 0 to about 50 weight percent (preferably about 5 to 30 weight percent) of said organic water miscible liquid and the balance up to 100 weight percent thereof being water.

This interpolymer system in such an emulsion can range in physical form from a dissolved state to a state involving suspended and dispersed interpolymer particles which are not more than about 10 microns in maximum size. In one preferred class of emulsions of this invention, the interpolymer system is in the physical form of discrete dispersed particles ranging from about 0.1 to 1 micron in maximum size. In another preferred class, the interpolymer system comprises discrete dispersed particles ranging from about 1 to 5 microns in maximum size.

Pigments and other non-functional additives may be present during in situ polymerization, and, if so, are present in a product latex.

The interpolymer present in a product emulsion of this invention has a structure and composition which is presently not elucidated. It is theorized that because, in such an interpolymer, there is characteristically a high degree of compatibility between alkyd resin and polymerized vinyl monomer, there may be at least some degree of copolymerization between the alkyd resin and the vinyl monomer in addition to polymerization between the vinyl monomers themselves, but there is not intent to be bound by theory herein.

A preferred class of product emulsions of this invention incorporates the following components in the respective ranges indicated (total 100% weight basis):

| Component | Weight Percent |
|---|---|
| Alkyd resin | 10 to 90 |
| H$_2$O miscible organic liquid | 0 to 20 |
| Vinyl monomer (polymerized) | 10 to 90 |
| H$_2$O | (balance) |

Characteristically, product emulsions of this invention additionally have excellent freeze-thaw stability, ease of manufacture, excellent mechanical stability, excellent pigment dispersing capability and freedom from grit and coagulum.

One more preferred class of product emulsions of this invention contains, as in situ polymerized monomer, on a 100 weight percent total such incorporated monomer basis, from about 90 to 100 weight percent styrene, and from 0 to about 10 weight percent hydroxyethyl acrylate.

Another such more preferred class of product emulsions of this invention contains, as in situ polymerized monomer, on a 100 weight percent total such incorporated monomer basis, from about 50 to 70 weight percent butyl acrylate, from about 30 to 40 weight percent methyl methacrylate, and from 0 to about 10 weight percent hydroxyethyl methacrylate.

Compositions derived from Product Latices

Product latices of this invention are particularly well adapted for use in coating and film-forming compositions.

Thus, a product latex as characterized above can additionally contain, on a 100 weight percent total weight basis, from about 0.5 to 85 weight percent of at least one pigment, said pigment being in the form of particles having a particle size distribution ranging from about 0.05 to 45 microns. Texturizing fillers can also be used, if desired.

A product latex can additionally contain on a 100 weight percent total weight basis from about 5 to 50 weight percent of organic, water soluble curing agent. Any such curing agent known to the arts of emulsion polymers and of water soluble alkyd resins characteristically can be used. For example, the curing agent can comprise a water soluble formaldehyde condensate, such as a melamine/formaldehyde condensate, a urea-formaldehyde condensate, a benzoguanamineformaldehyde condensate, or the like. For another example, low molecular weight epoxy resins can be used as curing agents, such as the so-called "Epon 828", a trade mark of Shell Chemical Company for one type of condensate believed to involve bisphenol A and epichlorohydrin, and the like. Another class of curing agents comprises polyaziridines. Other curing agents are essentially monomeric, and include such materials as hexamethoxymethyl melamine, and the like.

In addition to being cured with a curing agent a product emulsion can, in general, be directly cured by air drying, including force drying, or by thermo-curing by esterification.

A preferred class of product emulsions of this invention which has an excellent combination of hardness, solvent resistance, and gloss when baked, for example, at 300° to 350° F for 15 to 30 minutes, incorporates the following components in the respective ranges indicated (100% total weight basis):

| Component | Weight Percent |
|---|---|
| 1. Product emulsion of this | from about 50 to 94 |

-continued

| Component | Weight Percent |
| --- | --- |
| invention (preferably about 40 wt. % interpolymer solids) | |
| 2. Pigment | from 0.5 to about 30 |
| 3. Hexamethoxymethyl melamine resin | from about 5–50 |
| 4. Dispersant | from 0 to about 4 |
| 5. Water (added) | from 0 to about 50 |

For purposes of this invention, a "dispersant" can be regarded as a surfactant which is added to a product emulsion of this invention to promote uniform separation of fine solid particles in a latex liquid composition such as paints, which use such a product.

Examples of suitable dispersants include anionic agents such as Tamol 731, from Rohm and Haas, Daxad 30, from W. R. Grace, and the like.

One preferred class of coating compositions of this invention is found to have use as an enamel, suitable for metal painting and the like. Such a coated enamel, even when merely air dried, has a gloss level which, so far as is known, has never heretofore been achieved in water based enamel with a mixed alkyd resin/vinyl emulsion polymer system. This class is characteristically comprised of the following types of components in the respective amounts indicated (100 weight percent total composition basis):

| | Weight Percent |
| --- | --- |
| (1) At least one product emulsion of invention (preferably about 40 wt. % interpolymer solids) | from about 50 to 95 |
| (2) Pigment | from 0.5 to about 30 |
| (3) Coalescing solvent | from 0 to about 10 |

Film or coating flow promoting agents can be included, if desired.

Coatings and Films

Product emulsions and compositions incorporating such are well adapted for use in coating and film forming applications. Conventional coating and film forming procedures are employed. Product coatings can be applied preferably by air spray and brushing, though any conventional application can be used. Air or oven drying can be used. Suitable elevated temperature ranges for drying can vary, but commonly fall in the range from about 70° to 350° F.

Coatings and films of this invention are characterized by superior water resistance, gloss, and leveling (flow) characteristics. Hardness characteristics are excellent, the exact hardness of any given coating or film being variable depending upon the materials present in a coating composition (e.g., a paint) at the time of application, as well as upon the temperature to which a coated surface is exposed after a coating operation.

For purposes of evaluating coatings and films of this invention, "water resistance" may be determined by allowing a film (or coating) to air-dry for 16 to 24 hours at ambient temperature after which droplets of water are placed on the film and covered with a watch glass. After selected intervals, observation is made for any visual changes and tests of the film mechanical strength are made by scratching, as with a fingernail or suitable instrument.

Similarly "gloss" may be measured with any standard gloss-meter using 20° and 60° angles of incidence of light.

Similarly, "levelling" may be measured by use of the New York Production Club (NYPC) levelling gauge. It is also estimated by visual observation of the disappearance of brush marks.

Preferred coatings of this invention have a hardness such that, when measured with the Sward Hardness Rocker, hardness values fall in the range from about 15 to 50. For hardness measurement purposes, "hardness" can be determined by coating a 3-mil wet filmon glass, allowing same to dry in air at ambient temperatures for 7 days, then using the Sward Hardness Rocker gauge.

Typically, coatings and films each have thicknesses ranging from about 0.3 to 1.5 mils. The emulsions and compositions adhere well to electronegative substrates of all types; including metals, plastics (excluding conventional polytetrafluoroethylene), woods, previously painted surfaces, and the like.

EMBODIMENTS

The present invention is further illustrated by reference to the following examples. Those skilled in the art will appreciate that other and further embodiments are obvious and within the spirit and scope of this invention from the teachings of these present examples taken with the accompanying specification.

EXAMPLE A

The following ingredients were used:

| Ingredient | Grams |
| --- | --- |
| 1. Pamolyn 200 | 1071 |
| 2. Trimethylol propane | 1005 |
| 3. Isophthalic acid (85% grade from Amoco Chem. Co.) | 897 |
| 4. Trimellitic anhydride | 297 |
| 5. Butoxy ethanol (Dowanol EB, Dow Chem. Co.) | 500 |
| 6. Butanol | 500 |

The first three ingredients were added to a flask fitted with a thermometer, a mechanical agitator, a nitrogen sparge tube, and a steam-heated partial condenser. A nitrogen sparge was started, heat was applied and agitation started. The temperature was gradually raised to 468° F at which point an acid value of 9.4 was obtained. The resin was cooled to 338° F and the fourth ingredient was added. The temperature was maintained between 343° F and 346° F for 1 hour 55 minutes until a cure time (Determined using a Thermoelectric cure plate), of 23 seconds was obtained. The resin was cooled to 310° F and the fifth and sixth ingredients were added in order. The final resin solution had the following characteristics:

| | |
| --- | --- |
| viscosity (Gardner-Holdt) | $Z_6$ |
| non-volatile content | 75.2% |
| acid value/non-volatile | 43.3 |
| hydroxyl number (calculated) | 107 (excess) |

EXAMPLE B

The following ingredients were used:

| | Grams |
| --- | --- |
| 1. Dehydrated castor oil (G-H grade, Baker Castor Oil Co.). | 337 |

-continued

| | Grams |
|---|---|
| 2. Soybean oil (Alkali-refined) | 231 |
| 3. Glycerine | 75 |
| 4. Pentaerythritol | 72 |
| 5. Lithium hydroxide monohydrate | 0.3 |
| 6. Isophthalic acid (85% grade, Amoco Chem. Co.) | 256 |
| 7. Trimellitic anhydride | 79 |
| 8. n-Butanol | 333 |

The first three ingredients were added to a flask fitted with a thermometer, mechanical agitator, inert gas sparge and 6-inch air condenser. An inert gas (nitrogen) flow of about 0.5 liters per minute and mechanical agitation was provided. The batch was heated to 350° F. The fourth and fifth ingredients were added and the batch was heated to 430°–440° F and held until a methanol solubility of 1 part of batch in 2 parts of methanol was reached. The sixth ingredient was added and the batch held at about 435° F until an acid value of 14 to 16 was reached. The batch was cooled to 350° F, the seventh ingredient was added, and the batch was held at 340°–350° F for 20 minutes and then cooled to 250° F. The eighth ingredient was added and the resin solution was stirred until homogeneous. It was then cooled and filtered.

This resin had the following constants:

| viscosity (Gardner-Holdt) | $Z_3$ |
|---|---|
| non-volatile content | 75% |
| acid value/non-volatile | 60 |

EXAMPLE C

The following ingredients were used:

| | Grams |
|---|---|
| 1. Soybean oil (alkali-refined) | 255 |
| 2. Trimethylol ethane | 342 |
| 3. Lithium hydroxide monohydrate | 0.2 |
| 4. Phthalic anhydride | 335 |
| 5. Trimellitic anhydride | 40 |
| 6. Xylene | 30 |
| 7. Trimellitic anhydride | 79 |
| 8. Butoxy ethanol (Dowanol EB Dow. Chem.Co.) | 399 |

The first three ingredients were added to a flask equipped with a thermometer, mechanical agitator, nitrogen gas sparge tube, water trap and water-cooled condenser. A nitrogen gas flow was set at 0.5 liters per minute, heat applied, and the agitator started when the temperature reached 400° F. The batch was heated to 460° F and held until the batch was soluble at least one part in nine parts of methanol. The batch was cooled to 400° F and the fourth, fifth and sixth ingredients were added. The batch was then heated to 350° F where water began to collect in the trap. The temperature was gradually allowed to rise to 425° F as water of esterification evolved. When the batch had an acid value/non-volatile of just less than 12, it was cooled to 265° F, the seventh ingredient added, and the batch was held until an acid value/non-volatile of 50–54 was obtained. The eighth ingredient was added and the resulting resin solution stirred until homogeneous.

This resin solution had the following constants:

| viscosity (Gardner-Holdt) | $Z_3$–$Z_4$ |
|---|---|
| non-volatile content | 70% |
| acid value based on non-volatile resin content | 52.0 |
| hydroxyl value (calculated) | 173 |

EXAMPLE D

The following ingredients were used:

| | Grams |
|---|---|
| 1. Pamolyn 240 | 431 |
| 2. Isophthalic acid (85% grade, Amoco Chem. Co) | 295 |
| 3. Trimethylol propane | 288 |
| 4. Trimellitic anhydride | 90 |
| 5. Methoxypropanol (Dowanol PM, Dow Chem. Co.) | 166 |
| 6. n-Butanol | 167 |

The first three ingredients were added to a flask equipped with a thermometer, mechanical agitator, nitrogen gas sparge tube and 6-inch air condenser. A nitrogen gas flow was set at 0.5 liters per minute, heat applied and the agitator started when a temperature of 250° F was reached. The batch was heated to 460° F over a four hour period, and held until a check viscosity of V to X at 70% non-volatile in xylene and an acid value on non-volatile of 14 to 16 was obtained. "Check viscosity" is herein determined by removing a small portion of a batch, reducing it to a specified non-volatile content in the specified solvent and determining the viscosity using the Gardner-Holdt rising air bubble method. The batch was cooled to 340° F, the fourth ingredient added, and the batch held for a check viscosity of X to Y at 50% non-volatile in xylene and an acid value on non-volatile of 60 to 65 was obtained. The batch was then cooled to 250° F, the fifth and sixth ingredients added, and the resin solution stirred until homogeneous. The resin solution had the following characteristics: viscosity $Z_4$, non-volatile content 75.7%, acid value/non-volatile 63.4.

EXAMPLE E

The following ingredients were used:

| | Grams |
|---|---|
| Tall oil fatty acids (low resin content) | 619 |
| Trimellitic anhydride | 147 |
| Polyethylene glycol (Carbowax 1000, Union Carbide Corp., N.Y., N.Y.) | 772 |
| Glycerine | 116 |

All four ingredients were added to a flask fitted with a thermometer, inert gas sparge tube, mechanical agitator, and a 6-inch air condenser. An inert gas flow was set at about 0.5 liters per minute, agitation started and the ingredients heated to 450°–460° F over a period of about five hours and then cooled. The resin was a viscous liquid with an acid value of 14.

EXAMPLE F

The following ingredients were used:

| | Grams |
|---|---|
| 1. Tall oil fatty acid (low rosin) | 600.0 |
| 2. Pentaerythritol (mono grade) | 192.2 |
| 3. Phthalic anhydride | 226.1 |
| 4. Polyethylene glycol (Carbowax 1540, | 240.0 |

-continued

| | Grams |
|---|---|
| Union Carbide Corp.) | |
| 5. Xylene | 40.0 |

All five ingredients were added to a flask fitted with a thermometer, mechanical agitator, water trap and water-cooled condenser thereon. Agitation was started and the batch heated slowly to 450°–460° F., and held until the acid value on non-volatile resin dropped to 17.5. The xylene was then removed under vacuum and the resin was cooled. The resin was a viscous liquid with an acid value of 17.

EXAMPLE G

The procedure of Example D was followed except that Dowanol DB from Dow Chemical Co. (Butoxy ethoxy ethanol) was substituted for the Dowanol PM and n-butanol.

EXAMPLE H

The following ingredients were used:

| | Grams |
|---|---|
| 1. Pelargonic acid (Emfac 1202, Emery Industries) | 250 |
| 2. Neopentyl glycol | 277 |
| 3. 1,3-Butylene glycol | 139 |
| 4. Trimellitic anhydride | 420 |
| 5. Dowanol EB (from Dow Chem. Co.) | 429 |

The first four ingredients were added to a flask fitted with a thermometer, mechanical agitator, a nitrogen sparge tube and steam-heated partial condenser. The nitrogen gas flow was set at about 0.5 liters per minute, the agitator started and the flask slowly heated to a temperature of 390°–400° F. When the acid value had dropped to about 70, the resin was cooled to 345° F and the fifth ingredient was added and the resultant resin solution stirred until homogeneous. The final viscosity was Y to Z, non-volatile content 68–70%, and acid value/non-volatile 60–65.

EXAMPLE I

The following ingredients were used:

| | Grams |
|---|---|
| 1. Tall oil fatty acids (low rosin) | 421 |
| 2. Pentaerythritol | 214 |
| 3. Phthalic anhydride | 328 |
| 4. Dimethylol propionic acid | 99 |
| 5. Xylene | 30 |
| 6. Butoxy ethoxy ethanol (Dowanol DB from Dow Chemical Co.) | 303 |

The first five ingredients were added to a flask fitted with a thermometer, mechanical agitator, nitrogen gas sparge tube, water trap and water-cooled condenser thereon. A nitrogen gas flow was set at 0.25 liters per minute, the agitator started and the batch heated slowly to 442° F. After the acid value on non-volatile had dropped to 68.5, the batch was cooled to 360° F, the sixth ingredient added and the batch stirred until homogeneous.

The final resin solution had the following constants:

| | |
|---|---|
| Viscosity (Gardner-Holdt) | $Z_6$ |
| Non-volatile content | 75.8% |
| Acid value/non-volatile | 60.0 |

EXAMPLE J

The following ingredients were used:

| | Grams |
|---|---|
| 1. Commercially pure lauric acid (Neofat 255 from Armak Company, Chicago, Illinois) | 375 |
| 2. Isophthalic acid | 331 |
| 3. Trimethylol propane | 320 |
| 4. Trimellitic anhydride | 90 |
| 5. Butoxy ethoxy ethanol (Dowanol DB from Dow Chem. Co.) | 333 |

The procedure used to prepare this resin was basically identical with Example D. The final resin constants were as follows:

| | |
|---|---|
| Viscosity | $Z_7+$ |
| Non-volatile content | 74.6% |
| Acid value/non-volatile | 60.8 |

EXAMPLE K

The following ingredients were used:

| | Grams |
|---|---|
| Pamolyn 240 | 431 |
| Isophthalic acid | 245 |
| Trimethylol propane | 259 |
| Trimellitic anhydride | 140 |
| Dowanol DB | 333 |

The procedure used to make the above alkyd was essentially similar to the procedure used to make the alkyd of Example D. The final resin characteristics were as follows:

| | |
|---|---|
| viscosity | $Z_4$–$Z_5$ |
| non-volatile content | 77.0% |
| Acid value/non-volatile | 97.0 |
| Hydroxyl number (calculated) | 42 |

EXAMPLE L

The following ingredients were added to a suitable reactor equipped with a steam-heated partial condenser:

| | |
|---|---|
| Neopentyl glycol | 378 g. |
| Propylene glycol | 70 g. |
| Isophthalic acid (99% grade, Amoco Chem. Co.) | 314 g. |
| Adipic acid | 259 g. |
| Trimellitic anhydride | 60 g. |

The stirred mixture was heated slowly to 460° F. while purging water of esterification with nitrogen gas. When an acid value of 15 ± 1 was reached, the batch was cooled to 330°–340° F., 60 grams trimellitic anhydride added, and the batch held until an acid value of 45–50 was obtained. The batch was then cooled and 250 grams of Dowanol EB, followed by 83 grams of n-butanol were added. The final solution had the following characteristics:

| | |
|---|---|
| viscosity (Gardner-Holdt) | $Z_4$-$Z_5$ |
| non-volatile content | 75 ± 1% by weight |
| acid value on non-volatile | 45–50 |

Emulsions of the present invention are prepared from Examples 1 through 21 as follows: Each product emulsion of this invention, so exemplified is substantially free from coagulum, unless otherwise noted. Also, in each example, the conversion of vinyl monomer to polymer is in excess of 90% (based on starting monomer) unless otherwise noted.

EXAMPLE 1

The following ingredients were used:

| Ingredient | Grams |
|---|---|
| Alkyd of Example D | 264 |
| 28% ammonia solution | 14 |
| Deionized water | 460 |
| Potassium persulfate | 1 |
| Potassium persulfate | 1 |
| Deionized water | 35 |
| Styrene | 200 |

The first three ingredients were added to a flask and heated, with agitation, to a temperature of 168° F. The fourth ingredient was added and the batch stirred for an additional ten minutes. The fifth ingredient was dissolved in the sixth and the resulting solution added concurrently with the seventh ingredient over a 2 hour period maintaining a batch temperature of 170°–172° F throughout the addition. The resulting emulsion was stirred for an additional two hours and cooled.

The final emulsion had the following characteristics:

| | |
|---|---|
| viscosity (Stormer) | 59 Krebs units |
| non-volatile content | 39.5% - by wt. |
| pH | 6.6 | a film of this emulsion cast on glass dried hard in about ½ hour at 37% relative humidity and 75° F. The film was clear, free from grit or seeds, and had a sward hardness of 42 after 24 hours. Further, this product was frozen solid and then thawed at room temperature five consecutive times without effecting the overall characteristics of the product. This emulsion can be used as prepared as a clear coating, e.g. varnish, and the dried film is transparent. Three coats of the product were applied to a wood substrate and allowed to dry at room temperature for seven days. Unlike many other commercially available emulsions, the film leveled completely showing no brush marks. A cotton ball saturated with a 1:1 by weight mixture of ethanol: water was applied to the film, covered with a watch glass, and allowed to remain in contact with the film for 1 hour. The cotton ball was then removed. No permanent damage to the film was noted.

EXAMPLE 2

The following ingredients were used:

| | |
|---|---|
| Alkyd from example E | 75 g. |
| Deionized water | 375 g. |
| 36% ammonia solution | 5 ml. |
| Styrene | 150 g. |
| Butyl acrylate | 75 g. |
| lauryl mercaptan | 6.75 g. |
| Deionized water | 30 g. |
| Potassium persulfate | 0.75 g. |
| Potassium persulfate | 0.2 g. |
| Butoxy ethanol | 45 g. |

The first three ingredients were added to a flask equipped as in Example 1 and thoroughly mixed while heating to 76° C. A premix of the fourth, fifth and sixth ingredients and a premix of the seventh and eighth ingredients were added to the flask over a 1½-2 hour period. After an additional 2 hours of reaction, the ninth ingredient was added and the reaction continued for 2 more hours. The tenth ingredient was then added. The final product was a pourable dispersion with a calculated non-volatile content of 42.2%.

EXAMPLE 3

The following ingredients were used:

| | | |
|---|---|---|
| Alkyd from Ex. F | 120.00 | g. |
| Water (deionized) | 375.00 | g. |
| 36% ammonia in water | 5.00 | (ml) |
| Styrene | 120.00 | g. |
| Butyl acrylate | 60.00 | g. |
| Lauryl mercaptan | 5.40 | g. |
| Warer (deionized) | 30.00 | g. |
| Potassium persulfate | 0.75 | g. |
| Potassium persulfate | 0.20 | g. |
| Potassium persulfate | 0.20 | g. |

Alkyd from Example F (120 gms.), 36% ammonia water (5 gms.) and water (375 gms.) were added to a flask, stirred and heated to 76° C. Styrene (120 gm.), Butyl acrylate (60 gms.) and lauryl mercaptan (5.4 gms.) were pre-mixed and added, along with potassium persulfate (0.75 gms) dissolved in water (30 gms.) over a 90 minute period, the batch temperature being maintained between 75° and 80° C. After an additional 50 minutes, potassium persulfate (0.2 gm) was added, and 2 hours later, another increment of potassium persulfate (0.2 gm) was added. After an additional 2 hours the batch was cooled. The final result was a pourable dispersion with a non-volatile content of 40.6% by wt.

EXAMPLE 4

This Example illustrates an 80% alkyd/20% monomer by wt. solids emulsion.

The following ingredients were used.

| | Grams |
|---|---|
| Alkyd from Example D | 423 |
| Ammonium hydroxide (28% ammonia) | 22 |
| Deionized water | 413 |
| Potassium persulfate | 1 |
| Potassium persulfate | 1 |
| Deionzed water | 35 |
| Styrene | 80 |

Alkyd from Example D (423 gms.), ammonium hydroxide (22 gms.) and deionized water (413 gms.) were added to a flask, stirred and heated while being sparged with nitrogen gas. Potassium persulfate (1 gm.) was added and the batch stirred an additional 20 minutes. Potassium persulfate (1.0 gms.) was dissolved in deionized water (35 gms.) and added, along with a separate stream of styrene monomer (80 gms.) over a period of about 3 hours. After an additional one hour, the batch was cooled. The resulting pourable, small particle size emulsion had the following characteristics.

| Viscosity (Brookfield) | 40,750 cps. |
| Non-volatile content | 38.9% by wt. |
| acid value/non-volatile | 50.7 |
| pH | 6.6 |

Monomer conversion was calculated to be 71.6% by wt.

EXAMPLE 5

The following ingredients were used:

| Alkyd of Example B | 239.2 |
| Dowanol DB | 17.1 |
| Triethylamine | 19.1 |
| Deionized water | 549.0 |
| Deionized water | 39.2 |
| Potassium persulfate | 1.2 |
| Potassium persulfate | 1.2 |
| Styrene | 67.4 |
| Methyl methacrylate | 66.6 |

Example B alkyd (239.2 gms.), Dowanol DB (17.1 g.), triethyl amine (19.1 g.), and deionized water (549.0 g.) were added to a flask, stirred, and heated to 165° F while purging with nitrogen gas. Potassium persulfate (1.2 gms) was added to the reactor, and the nitrogen flow stopped. An additional increment of potassium persulfate (1.2 g.) was dissolved in deionized water (39.2 g.) and added, along with a separate pre-mix of styrene (67.4 g.) and methyl methacrylate (66.6 g.) over a 3 hour period maintaining a batch temperature of 165° F to 170° F. The batch was held at 165°–170° F for an additional 1–2 hours and cooled. The final product was pourable and had the following characteristics:

| viscosity (Stormer) | 65–75 K.U. |
| non-volatile content | 29.31% by wt. |
| pH | 7.0–8.0 |

EXAMPLE 6

The following ingredients were used:

| Formula | Parts/Wt. |
| --- | --- |
| Alkyd of Example G | 269 |
| 28% ammonia in water | 16 |
| Deionized water | 433 |
| Deionized water | 10 |
| Ammonium persulfate | 1 |
| Ammonium persulfate | 1 |
| Deionized water | 40 |
| Styrene | 190 |
| Hydroxy ethyl acrylate | 10 |
| Ammonium persulfate | 1 |
| Deionized water | 10 |

Example G alkyd (269 g.), ammonium hydroxide (16 g.) and deionized water (433 g.) were added to a flask, stirred and heated to 160° F ammonium persulfate (1.0 g.) was dissolved in deionized water (10 g.) and added to the flask. Ammonium persulfate (1.0 g.) was dissolved in deionized water (40 g.) and added, along with a separate pre-mix of styrene (190 g.) and hydroxyethyl acrylate (10g.) over a 1 hour 15 minute period maintaining a batch temperature of 162°–174° F. After about 1 hour, ammonium persulfate (1.0g) dissolved in deionized water (10g.) was added to the flask. After about 1½ additional hours, the batch was cooled. The resulting product was pourable and had the following characteristics:

| viscosity (Brookfield) | 200 cps. |
| Non-volatile content | 40.8% by weight |
| pH | 8.15 |

EXAMPLE 7

The following ingredients were used:

| | Grams |
| --- | --- |
| Alkyd from Example G | 269 |
| Ammonium Hydroxide | 16 |
| Deionized water | 453 |
| Potassium persulfate | 1 |
| Potassium persulfate | 1 |
| Deionized water | 35 |
| Styrene | 160 |
| Acrylonitrile | 40 |

Alkyd (269g.), ammonium hydroxide (16g.) and deionized water (453g.) was added to a flask, stirred and heated to 160° F while purging air from the reactor with nitrogen gas. The nitrogen gas flow was discontinued and potassium persulfate (1 g.) added. Fifteen minutes later at 166° F, a mixture of potassium persulfate (1g.) dissolved in deionized water (35g.) was added drop-wise along with a separate drop-wise addition of a mixture of styrene (160g.) and acrylonitrile (40g.) over a period of about 2 hours maintaining a batch temperature of 176°–178° F. After an additional one hour of reaction time, the batch was cooled to room temperature. The final product was a small particle size, pourable emulsion with a Brookfield viscosity of 67 cps. (20 rpm, #1 spindle) and a pH of 7.0. A film of the emulsion dried hard on glass in about 5 hours and was very clear and tough.

EXAMPLE 8

The following ingredients were used:

| | Parts by wt. |
| --- | --- |
| Alkyd of Example H | 259 |
| 28% ammonia solution | 14 |
| Deionized water | 490 |
| Sodium persulfate | 2 |
| Deionized water | 10 |
| Butyl methacrylate | 200 |

The first three ingredients were added to a flask fitted with a thermometer, mechanical agitator and water-cooled condenser. The flask was heated in a water bath to 156° F. The fourth and fifth ingredients were pre-mixed and added to the flask. The sixth ingredient was then added over about a one hour period. The resulting emulsion was then stirred for an additional hour at 168°–174° F, then cooled and discharged. The final product was a thick, but pourable emulsion free from coagulum with a pH of 7.8. A cast film of the emulsion was continuous and dried tack-free at ambient temperature (about 77° F).

EXAMPLE 9

The following was charged to a suitable reaction vessel:

| Deionized Water | 500 g. |
| Alkyd from Example K | 268 g. |
| Ammonium Hydroxide | 13.2 g. |

The mixture was heated to 75° C. While purging with nitrogen gas. The nitrogen purge was then discontinued and one gram of sodium persulfate was added. Immediately thereafter was begun the addition of the following mixture:

| Styrene | 200 g. |
| n-Octyl Mercaptan | 2 g. |

This mixture was added over a period of 1¼ hours. Concurrently was added the following solution:

| Deionized Water | 20 g. |
| Sodium Persulfate | 1 g. |

The temperature was maintained between 75° and 80° C. during the addition and for a period of 1 hour thereafter, whereupon the product was cooled to room temperature. The final pourable emulsion had a pH of 6.8, a viscosity of 50–100 cps. and dried tack-free at room temperature in a short time.

EXAMPLE 10

The following was charged to a suitable reaction vessel:

| Deionized Water | 503 g. |
| Alkyd from Example I | 267 g. |
| Ammonium Hydroxide | 13.3 g. |

The mixture was heated to 75° C. while purging with nitrogen gas. The nitrogen purge was then discontinued and one gram of sodium persulfate was added. Immediately thereafter was begun the addition of 200 g. of styrene over a period of 4 hours. Concurrently was added the following solution:

| Deionized Water | 20 g. |
| Sodium Persulfate | 1 g. |

The temperature was maintained between 75° and 80° C. during the addition and for a period of one hour thereafter, whereupon the product was cooled to room temperature. The final emulsion had a pH of 6.8, was a very viscous pourable solution and formed a slightly hazy film at room temperature.

EXAMPLE 11

The following mixture was added to a suitable reaction vessel:

| Deionized Water | 482 g. |
| Alkyd from Example C | 287 g. |
| Ammonium Hydroxide | 11.7 g. |

The mixture was heated to 75° C. while purging with nitrogen gas. The nitrogen purge was then discontinued and one gram of sodium persulfate was added. Immediately thereafter was begun the addition of 200 grams of styrene. This addition was carried out over a period of 2 hours. Concurrently was added the following solution:

| Deionized Water | 20 g. |
| Sodium Persulfate | 1 g. |

The temperature of the reaction mixture was maintained between 75° and 80° C. during the course of the addition and for a period of one hour thereafter, whereupon the product was cooled to room temperature. The final product was pourable and had the following characteristics: non-volatile = 40.8% by wt., pH = 6.8, viscosity = 1120 cps. The product formed a clear, continuous film at room temperature.

EXAMPLE 12

The following mixture was added to a suitable reaction vessel:

| Deionized Water | 500 g. |
| Alkyd from Example L | 260 g. |
| Ammonium Hydroxide | 21 g. |

The mixture was heated to 75° C. while purging with nitrogen gas. The nitrogen purge was then discontinued and 1 gram of sodium persulfate was added. Immediately thereafter was begun the addition of 200 grams of styrene. This addition was carried out over a period of 1¼ hours. Concurrently was added the following solution:

| Deionized Water | 20 g. |
| Sodium Persulfate | 1 g. |

The temperature of the reaction mixture was maintained between 75° and 80° C. during the course of the addition and for a period of one hour thereafter, whereupon the product was cooled to room temperature, was pourable, and had the following characteristics: non-volatile — 40.3%, pH = 8.2; viscosity 32.5 cps. The 24 hour old film of the composition disintegrated after 30 minute exposure to water. This indicates its possible use as a temporary protective coating. The water resistance of the product emulsion is improved by admixing therewith about 3–4½ parts by weight of polyaziridine (Pfaz 300 from Ionac Chem. Co.,).

EXAMPLE 13

The following mixture was added to a suitable reaction vessel:

| Deionized Water | 470 g. |
| Alkyd from Example G | 134 g. |
| Ammonium Hydroxide | 8 g. |

The mixture was heated to 75° C. while purging with nitrogen gas. The nitrogen purge was then discontinued and three parts of sodium persulfate was added. Immediately thereafter was begun the addition of the following mixture:

| Methyl Methacrylate | 67 g. |
| Styrene | 150 g. |
| Butyl Acrylate | 75 g. |
| Butoxyethanol | 56 g. |

This addition was carried out over a period of 2 hours. Concurrently was added the following solution:

| Deionized Water | 25 g. |
|---|---|
| Acrylic Acid | 8 g. |
| Ammonium Hydroxide | 8 g. |

The temperature of the reaction mixture was maintained between 75° and 80° C. during the course of the addition and for a period of 1 hour thereafter, whereupon the product was cooled to room temperature was pourable, and had the following characteristics: nonvolatile — 40.2%, pH = 6.7, viscosity = 79 cps. The dried film (24 hour air dry at room temperature) withstood 1½ hour contact with water before failure.

EXAMPLE 14

The following mixture was added to a suitable reaction vessel:

| Deionized Water | 500 g. |
|---|---|
| Commercial Alkyd (Cargill 7407) | 136 g. |
| Ammonium Hydroxide | 6.1 g. |

The mixture was heated to 75° C. while purging with nitrogen gas. The nitrogen purge was then discontinued and three grams of sodium persulfate were added. Immediately thereafter was begun the addition of the following mixture:

| Methyl Methacrylate | 132 g. |
|---|---|
| Butyl Acrylate | 148 g. |
| Hydroxyethyl Acrylate | 16 g. |
| N-Isobutoxymethyl Acrylamide | 32 g. |

This addition was carried out over a period of 2 hours. The temperature of the reaction mixture was maintained between 75° and 80° C. during the course of the addition and for a period of one hour thereafter, whereupon the product was cooled to room temperature, was pourable, and had the following characteristics: viscosity = 25–50 cps., pH = 5.8. The product formed a clear, continuous film at room temperature.

EXAMPLE 15

The following ingredients were charged to a suitable reaction vessel:

| Deionized Water | 634 g. |
|---|---|
| Alkyd from Example G | 100 g. |
| Ammonium Hydroxide | 6 g. |

The mixture was heated to 75° C. while purging with nitrogen gas. The nitrogen purge was then stopped and 2 grams of sodium persulfate was added. Immediately thereafter was begun the addition of the following mixture:

| Butyl Acrylate | 56 g. |
|---|---|
| Vinyl Acetate | 169 g. |
| n-Octyl Mercaptan | 2 g. |

The addition was made over a period of 1 hour. Concurrently was added the following solution:

| Deionized Water | 30 g. |
|---|---|
| Sodium Persulfate | 1 g. |

The temperature of the reaction mixture was maintained between 65° and 75° C. during the course of the addition and for a period of 1½ hours thereafter, whereupon the product was cooled to room temperature. The product was a pourable liquid which formed a clear film at room temperature.

EXAMPLE 16

The following mixture was added to a suitable reaction vessel:

| Deionized Water | 460 g. |
|---|---|
| Commercial Alkyd (Cargill 7407) | 144 g. |
| Ammonium Hydroxide | 6.6 g. |

The mixture was heated to 75° C. while purging with nitrogen gas. The nitrogen purge was then discontinued and one part of sodium persulfate was added. Immediately thereafter was begun the addition of the following mixture:

| Butyl Acrylate | 144 g. |
|---|---|
| Methyl Methacrylate | 202 g. |

This addition was carried out over a period of 1 hour. Concurrently was added the following solution:

| Deionized Water | 35 g. |
|---|---|
| Sodium Persulfate | 1 g. |

The temperature of the reaction mixture was maintained between 75° and 80° C. during the course of the addition and for a period of 1 hour thereafter, whereupon the product was cooled to room temperature. The final product was a pourable emulsion which was stable for at least 8 months at room temperature and can be formulated into a water-based paint.

EXAMPLE 17

The following mixture was added to a suitable reaction vessel:

| Deionized Water | 500 g. |
|---|---|
| Commercial Alkyd (Cargill 7407) | 136 g. |
| Ammonium Hydroxide | 5.5 g. |
| Sodium Formaldehyde Sulfoxylate | 0.5 g. |

The mixture was heated to 75° C while purging with nitrogen gas. The nitrogen purge was then discontinued and immediately was begun the addition of the following mixture:

| Methyl Methacrylate | 140 g. |
|---|---|
| Butyl Acrylate | 148 g. |
| Hydroxyethyl Acrylate | 40 g. |
| t-Butyl Hydroperoxide (10%) | 2 g. |

This addition was carried out over a period of 1 hour. Concurrently was added the following solution:

| Deionized Water | 50 g. |
| Sodium Formaldehyde Sulfoxylate | 1.5 g. |

The temperature of the reaction mixture was maintained between 50° and 55° C during the addition and for a period of 1 hour thereafter, whereupon the product was cooled, and had the following characteristics: non-volatile 39.4%, pH = 6.7. The product formed a clear, continuous film at room temperature. Cargill Water Reducible alkyd 7407 is reportedly a fatty acid alkyd dissolved in Propasol P (propoxy propanol) with an acid value on non-volatile resin of 50–60, a Gardner-Holdt viscosity of Z4–Z6, a non-volatile content of 80 ± 2% and a hydroxyl value of 30 to 50.

EXAMPLE 18

The following mixture was added to a suitable reaction vessel:

| Deionized Water | 466 g. |
| Alkyd from Example A | 28 g. |
| Ammonium Hydroxide | 1.5 g. |

The mixture was heated to 75° C. While purging with nitrogen gas. The nitrogen purge was then discontinued and one gram of sodium persulfate was added. Immediately thereafter was begun the addition of the following mixture:

| Butyl Acrylate | 189 g. |
| Methyl Methacrylate | 262 g. |

This addition was carried out over a period of 1 hour. Concurrently was added the following solution:

| Deionized Water | 50 g. |
| Sodium Persulfate | 1 g. |

The temperature of the reaction mixture was maintained between 75° and 80° C during the course of the addition and for a period of 1 hour thereafter, whereupon the product was cooled to room temperature.

Unlike the products of the other Examples this product contained a small proportion of coagulum deposited on the surfaces of the vessel. The final product was a pourable aqueous emulsion which can be formulated into a water-based paint.

EXAMPLE 19

The following was charged to a suitable reaction vessel:

| Deionized Water | 474 g. |
| Alkyd of Example A | 56 g. |
| Ammonium Hydroxide | 2.2 g. |

This mixture was heated to 75° C.

To this was added 1 g. sodium persulfate. Immediately thereafter was added, over a period of 3 hours the following monomer mixture:

| Butyl Acrylate | 180 g. |
| Methyl Methacrylate | 250 g. |

Concurrently with the monomer mixture was added:

| Deionized Water | 35 g. |
| Sodium Persulfate | 1 g. |

The temperature was maintained between 75° and 80° C during the reaction and for a period of one hour thereafter. The product was then cooled to room temperature. The final product was a pourable aqueous emulsion which can be formulated into a water-based paint.

EXAMPLE 20

The following ingredients were charged to a suitable reaction vessel:

| Deionized Water | 457 g. |
| Polyester from Example L | 153.6 g. |
| N,N-Dimethyl Ethanolamine | 8.3 g. |

The mixture was purged with nitrogen gas while heating to 70° C. The nitrogen purge was discontinued and one part of sodium persulfate was added. Immediately thereafter was begun the addition of the following mixture:

| Butyl Acrylate | 164.4 g. |
| Methyl Methacrylate | 164.4 g. |
| Hydroxyethyl Methacrylate | 17.3 g. |

The addition was made gradually over a period of 2 hours. Concurrently was added the following mixture:

| Deionized Water | 35 g. |
| Sodium Persulfate | 1 g. |

The temperature was maintained between 70° and 75° C. during the course of the additions and for a period of one hour thereafter, whereupon the product was cooled to room temperature. A pourable liquid was obtained which, upon drying, produced a clear film. The liquid dispersion displayed room temperature storage stability of at least 8 months.

EXAMPLE 21

The following is charged to a suitable reaction vessel:

| Deionized Water | 340 g. |
| Alkyd from Example K | 300 |
| Ammonium Hydroxide | 14.8 g. |

The mixture is heated to 75° C while purging with nitrogen gas. The nitrogen purge is then discontinued and 1 gram of sodium persulfate is added. Immediately thereafter is begun the addition of the following mixture:

| Styrene | 225 g. |
| n-Octyl Mercaptan | 4 |

This mixture is added over a period of 2 hours. Concurrently is added the following solution:

| Deionized Water | 20 g. |

| | |
|---|---|
| Sodium Persulfate | 1 |

The temperature is maintained between 75° and 80° C. during the addition and for a period of 1 hour thereafter, whereupon the product is cooled to room temperature. A pourable emulsion results which forms a tack free film when dried at room temperature. The product emulsion contains 55 weight percent total solids and appears to be storage stable. This latex can be pigmented.

Examples of coating compositions of this invention incorporating emulsions as prepared above are as follows:

EXAMPLE I

The following ingredients were used:

| | Grams |
|---|---|
| Product from Example 1 | 248.0 |
| Rutile titanium dioxide | 80.0 |
| Dowanol DB | 17.8 |
| FC-430 (flow control agent, 3M Co.) | 20 drops |

All of the ingredients were added to a standard ball mill and rolled for 16 hours. The resulting product had the following characteristics:

| | |
|---|---|
| Viscosity (#4 Ford Cup) | 24 seconds |
| Pigment/binder | 0.8/1.0 |
| Non-volatile content | 52.0% by wt. |

Using an ordinary air atomizing spray gun, the product of this Example I was spray applied onto a metal panel. After 4 hours at room temperature the resulting film was dry hard and had a 60° gloss of 92.

A 3 mil (wet) film of this product was applied on glass. After 24 hours of drying at room temperature, the resulting film had a 60° gloss of 96 and was only slightly softened after 3 hours contact with tap water. The film completely recovered in ½ hour. The 24 hr. Sward hardness was 32 and was 52 after 7 days. A sample of the paint was placed in an oven maintained at 125°–130° F. Initially, the paint had a #4 Ford viscosity of 24 seconds and a pH value of 8.6. After eight weeks, the #4 Ford viscosity was 33 seconds and the pH value was 6.9. Dried films of this paint were still glossy, hard and water resistant.

EXAMPLE II

The following ingredients were used:

| | |
|---|---|
| Titanium dioxide (rutile) | 60.0 g. |
| Product from Exaple 2 | 178.0 g. |
| Butyl Cellosolve | 11.2 g. |
| Cyclodex Cobalt 6% (Tenneco Chem'ls., Inc.-Piscataway, N.J.) | 5 ml. |

All of the above ingredients were added to a ball mill and rolled for 16 hours.

A dried film of the above paint on glass had a 20° gloss of 65. The film was somewhat soft but increased in hardness with time.

EXAMPLE III

The following ingredients were used:

| | |
|---|---|
| Titanium dioxide (rutile) | 60.0 g. |
| Product of Example 3 | 183.0 g. |
| Butyl Cellosolve | 11.6 g. |
| Cuyclodex Cobalt 6% | 0.5 ml. |

All of the ingredients were added to a ball mill and rolled for 16 hours.

A dry film of the resultant paint on glass had a 20° gloss of 84 and was very tough.

EXAMPLE IV

The following ingredients were used:

| | Grams |
|---|---|
| Product of Example 6 | 248.0 |
| Rutile titanium dioxide | 65.0 |
| Dowanol DB | 13.4 |

All three ingredients were added to a ball mill and rolled for 16 hours. The resulting paint had the following characteristics:

| | |
|---|---|
| Viscosity (#4 Ford cup) | 52 seconds |
| Non-volatile | 50.6% by wt. |
| Pigment/binder | 0.65/1.00 |

The paint was spray-applied to metal panels and allowed to dry at about 70°–75° F and 35% relative humidity. After 24 hours, the 60° gloss was found to be 95–97. After 21 days at room temperature, it was still 95.

A 3 mil (wet) film of the paint was applied to glass and allowed to dry at 75°–77° F and about 35% relative humidity. It was dry hard in 3½ hours. After 24 hours of drying, a drop of water was placed on the film and covered with a watch glass. After 2 hours of contact, there was no effect on the film. After 4 hours of contact the appearance of the film was still unaffected.

EXAMPLE V

A series of compositions were prepared using the procedure of Example 1. The alkyd/monomer ratio was varied from 50/50 to 80/20. The characteristics of the solutions and films derived therefrom are summarized in the following table:

| Solution Properties | | | | |
|---|---|---|---|---|
| Alkyd/monomer (solids basis) | 50/50 | 60/40 | 70/30 | 80/20 |
| Viscosity (cps) | 75 | 275 | 20,500 | 40,750 |
| Non-volatile, % by wt. | 40.3 | 39.1 | 41.0 | 38.9 |
| pH | 7.15 | 7.0 | 6.4 | 6.6 |

| Dry Film Properties | | | | |
|---|---|---|---|---|
| Sward hardness after: | | | | |
| 3 days at R.T. | 38 | — | — | — |
| 4 days at R.T. | — | 34 | 18 | 14 |
| 7 days at R.T. | 42 | 38 | 30 | 22 |
| Film clarity | sl. hazy | hazy | v.sl. hazy | clear |

EXAMPLE VI

The following ingredients were combined:

| | |
|---|---|
| Cargill 7407 | 38.0 g. |
| Ammonium hydroxide | 1.7 g. |
| Deionized water | 60.3 g. |
| Neocryl A-601 (Vinyl polymer latex supplied by Polyvinyl Chemicals) | 93.8 g. |

A 3 mil (wet) film of the composition was applied to glass and allowed to dry at 70°–77° F and about 35% relative humidity. The resultant film was hazy and dull indicating lack of compatibility.

EXAMPLE VII

The following ingredients were used:

| | Grams |
|---|---|
| Alkyd of Example B | 40.0 |
| Dowanol DB | 10.0 |
| 6% Zirconium Nuxtra | 1.7 |
| 6% Manganese naphthenate | 0.8 |
| Activ 8 | 0.1 |
| Triethylamine | 3.2 |
| Deionized water | 100.0 |
| Titanium dioxide (rutile) | 100.0 |

All of the above ingredients were added to a pebble mill and ground for 16 hours. The following was then added:

| | |
|---|---|
| Composition of Example 5 | 227.3 g. |

The resulting paint had the following characteristics:

| | |
|---|---|
| viscosity (Stormer) | 56 Krebs units |
| Pigment to binder ratio | 1/1 |
| Non-volatile | 42.7% by wt. |
| pH | 7.3 |

A 3 mil (wet) film on glass dried hard in 2 hours 45 minutes at 77° F and 49% rel. humidity. It has a Sward hardness of 34 after 1 day and 38 after 8 days.

EXAMPLE VIII

The following ingredients are used:

| | |
|---|---|
| Titanium Dioxide (rutile) | 215 g. |
| Product from Example 17 | 59 |
| Daxad 30 (dispersant, W.R. Grace Co.) | 1 |
| Cymel 303 (hexamethoxymethyl melamine) | 15 |
| Water | 10 |

All of the ingredients are added to a standard ball mill and rolled for 16 hours. A product results that is suitable for spray application using an ordinary air atomizing spray gun. Such a spray applied coating converts to a hard, glossy, solvent resistant film after heating at 350° F. for a period of 15 minutes.

We claim:

1. A storage stable, emulsifier free, pourable emulsion comprising on a 100 weight percent total weight basis:
    (A) from about 10 to 65 weight percent of an interpolymer system, and
    (B) the balance up to 100 weight percent thereof being a carrier liquid selected from the group consisting of water and an organic water miscible liquid,
    (C) said interpolymer system comprising on a 100 weight percent total non-volatile resin solids basis
        (1) from about 5 to 90 weight percent of preformed, water-soluble alkyd resin which is free from unsaturated dibasic acid material selected from the group consisting of maleic acid, maleic anhydride, fumaric acid and itaconic acid and which has been pre-neutralized to a starting aqueous alkyd resin solution pH ranging from about 6 to 9, and
        (2) the balance up to 100 weight percent thereof being at least one in situ emulsion polymerized vinyl monomer,
    (D) said carrier liquid comprising on a 100 weight percent total carrier liquid basis:
        (1) from 0 to about 50 weight percent of said organic water miscible liquid, and
        (2) the balance up to 100 weight percent thereof being water.

2. The emulsion of claim 1 wherein said alkyd resin is characterized by having a hydroxyl value of from 1 to about 200, an acid number of from about 10 to 100, and a molecular weight from about 1000 to 5000.

3. The emulsion of claim 2 wherein said alkyd resin comprises, on a 100 weight percent total resin weight basis, from about 25 to 60 weight percent of at least one member selected from the group consisting of triglyciride oils, glycidyl esters, and monobasic acid, from about 15 to 35 weight percent polyhydric alcohol having 2 to 6 hydroxyl groups per molucule, from about 25 to 34 weight percent dicarboxylic acid or dicarboxylic acid anhydrides, and from 0 to about 12 weight percent of tricarboxylic acid.

4. The emulsion of claim 2 having an acid number of 40 to 100.

5. The emulsion of claim 1 wherein said vinyl monomers each has molecular weight in the range from about 53 to 142, contains at least one ethylenically unsaturated group per molecule, and is polymerizable through such group under aqueous liquid phase conditions in the presence of a free radical initiator.

6. The emulsion of claim 5 wherein said vinyl monomer is selected from the group consisting of arylalkenes, lower alkyl acrylates, lower alkyl methacrylates, hydroxy lower alkyl acrylates, hydroxy lower alkyl methacrylates, lower alkenyl nitriles, lower alkenyl carboxylic acids, lower alkenyl amides, hydroxymethyl lower alkenyl amides, lower alkyl butenedioates, vinyl lower alkenoates, amino lower alkyl acrylates, and amino lower alkyl methacrylates.

7. The emulsion of claim 1 wherein said in situ polymerized vinyl monomers are comprised on a 100 weight percent total such incorporated monomer basis of:
    (A) from about 90 to 100 wt.% styrene, and
    (B) from 0 to about 10 wt.% hydroxyethyl acrylate.

8. The emulsion of claim 1 wherein said in situ polymerized vinyl monomers are comprised on a 100 weight percent total such incorporated monomer basis of
    (A) from about 50 to 70 wt.% butyl acrylate,
    (B) from about 30 to 40 wt.% methyl methacrylate, and
    (C) from 0 to about 10 wt.% hydroxyethyl methacrylate.

9. The emulsion of claim 1 wherein discrete polymer particles suspended and dispersed therein are not more than about 10 microns in average maximum size.

10. The emulsion of claim 1 wherein discrete polymer particles suspended are dispersed therein range from about 0.1 to 1 micron in maximum size.

11. The emulsion of claim 1 wherein discrete polymer particles suspended and dispersed therein range from about 1 to 5 microns in maximum size.

12. The emulsion of claim 1 wherein said liquid is selected from the group consisting of butoxyethanol and butoxyethoxyethanol.

13. The emulsion of claim 1 additionally containing on a 100 weight percent total weight basis from about 0.5 to 85 weight percent of pigment, said pigment being in the form of particles having a particle size distribution ranging from 0.05 to 45 microns.

14. The emulsion of claim 1 additionally containing on a 100 weight percent total weight basis from about 5 to 50 weight percent of organic, water soluble curing agent.

15. The emulsion of claim 14 wherein said curing agent comprises a water soluble melamine/formaldehyde condensate.

16. The emulsion of claim 14 wherein said curing agent comprises a water soluble polyaziridine.

17. An emulsion of claim 1 which incorporates the following components on a 100 weight percent total weight basis:
(A) from about 10 to 90 weight percent of said alkyd resin,
(B) from about 0.1 to 20 weight percent of a water miscible organic liquid,
(C) from about 10 to 90 weight percent of said polymerized vinyl monomer, and
(D) the balance up to 100 weight percent being water.

18. An emulsion of claim 1 which incorporates the following components on a 100 weight percent total weight basis:
(A) from about 50 to 94 weight percent of an emulsion of claim 1,
(B) from 0.5 to about 30 weight percent of pigment having a particle size distribution ranging from about 0.5 to 45 microns,
(C) from about 5 to 50 weight percent of a hexamethoxymethyl melamine resin,
(D) from 0 to about 4 weight percent of a dispersant, and
(E) from 0 to about 50 weight percent of added water.

19. The emulsion of claim 1 wherein said alkyd resin is stable in an aqueous solution.

20. The emulsion of claim 1 containing from about 65 to 50 weight percent of said interpolymer system, and wherein said interpolymer contains from about 15 to 50 weight percent of said alkyd resin.

21. The emulsion of claim 1 wherein said alkyd resin is so neutralized with ammonium hydroxide.

22. The emulsion of claim 1 wherein said alkyd resin is so neutralized with a base selected from the group consisting of triethyl amine and trimethylamine.

23. The emulsion of claim 1 wherein said carrier liquid comprises from about 5 to 30 weight percent of said water miscible organic liquid with the balance up to 100 weight percent being water.

24. The emulsion of claim 23 wherein said organic water miscible liquid comprises butoxyethoxyethanol.

25. A process for making an emulsion comprising the steps of adding at least one vinyl monomer in the presence of an initiator to an aqueous solution, said solution being emulsifier free and comprising initially on a 100 weight percent total weight basis:
(A) from about 10 to 60 weight percent of at least one dissolved alkyd resin which is free from unsaturated dibasic acid material selected from the group consisting of maleic acid, maleic anhydride, fumaric acid, and itaconic acid,
(B) sufficient base to neutralize such solution to a pH ranging from 6 to 9, and
(C) the balance up to 100 weight percent of any given such solution comprising water and at least one water miscible solvent which is present in an amount from 0 up to about 50 weight percent based on total starting aqueous alkyd resin solution,
said adding being carried out while maintaining the temperature of said aqueous system in the range from about 25° to 95° C, thereby to form an emulsion polymer, the total amount of said vinyl monomer so added being sufficient to produce from about 10 to 65 weight percent of emulsion polymer in the resulting such aqueous system, said emulsion polymer as formed being stabilized by said alkyd resin.

26. The process of claim 25 wherein said alkyd resin is characterized by having a hydroxyl value of from 1 to about 200, an acid number of from about 10 to 100, and a molecular weight of from about 1000 to 5000.

27. The process of claim 25 wherein each one of said vinyl monomers has a molecular weight ranging from about 53 to 142, contains at least one ethylenically unsaturated group per molecule, and is polymerizable through said group under aqueous liquid phase conditions in the presence of a free radical initiator.

28. The process of claim 25, wherein said vinyl monomers so added are comprised on a 100 weight percent total basis of
(A) from about 90 to 100 wt.% styrene, and
(B) from 0 to about 10 wt.% hydroxyethyl acrylate.

29. The process of claim 25 wherein said vinyl monomers so added are comprised on a 100 weight percent total basis of
(A) from about 50 to 70 wt.% butyl acrylate,
(B) from about 30 to 40 wt.% methyl methacrylate, and
(C) from 0 to about 10 wt.% hydroxyethyl methacrylate.

30. The process of claim 25 wherein said so-formed latex polymer is comprised of particles which are not more than about 10 microns in average maximum size.

31. The process of claim 25 wherein said so formed latex polymer is comprised of particles which range in size from about 0.1 to 1 micron in average maximum size.

32. The process of claim 25 wherein said so formed latex polymer is comprised of particles which range in size from about 1 to 5 microns in average maximum size.

33. The process of claim 25 wherein, after said adding, there is admixed with said resulting aqueous system from about 5 to 50 weight percent of organic, water soluble curing agent.

34. The process of claim 33 wherein said curing agent comprises a water soluble formaldehyde condensate.

35. A process of making a paint comprising the step of mixing with an emulsion of claim 1 from about 0.5 to 85 weight percent, same basis, of pigment, said pigment being in the form of particles having a particle size distribution ranging from about .05 to 45 microns.

36. A film produced by air drying a layer of an emulsion of claim 1.

37. An electronegative substrate coated with a dried layer of an emulsion of claim 1.

38. A coating produced by drying on an electronegative surface a layer of an emulsion of claim 13.

39. A coating produced by drying on an electronegative surface a layer of an emulsion of claim 14.

40. A coating comprised of a dried emulsion of claim 3.

41. A coating comprised of a dried emulsion of claim 6.

42. A coating comprised of a dried emulsion of claim 7.

43. A coating comprised of a dried emulsion of claim 8.

44. A coating comprised of a dried emulsion of claim 9.

45. A coating comprised of a dried emulsion of claim 10.

46. A coating comprised of a dried emulsion of claim 11.

47. A coating comprised of a dried emulsion of claim 13.

48. A coating comprised of a dried emulsion of claim 15.

49. A coating comprised of a dried emulsion of claim 16.

50. A coating composition comprising on a 100 weight percent total composition basis:
   (A) from about 50 to 95 weight percent of at least one emulsion of claim 1,
   (B) from about 0.5 to 30 weight percent of dispersed pigment, and
   (C) from 0 to about 10 weight percent of coalescing solvent.

51. A process for making an emulsion comprising the step of adding while agitating at least one vinyl monomer to an aqueous solution, said aqueous solution comprising initially on a 100 weight percent total weight basis:
   (A) from about 15 to 25 weight percent of a preformed, dissolved alkyd resin which is free from unsaturated dibasic acid material selected from the group consisting of maleic acid maleic anhydride, fumaric acid and itaconic acid,
   (B) sufficient base to neutralize such solution to a pH ranging from about 6 to 9,
   (C) from about 0.1 to 5 weight percent of a dissolved vinyl monomer polymerization initiator, and
   (D) from about 40 to 90 weight percent water and optionally at least one water miscible solvent which is present in an amount up to about 50 weight percent based on total starting aqueous alkyd resin solution,
said adding being carried out while maintaining the temperature of said aqueous system in the range from about 25° to 95° C, thereby to form a latex polymer, the total amount of said vinyl monomer so added being sufficient to produce from about 15 to 50 weight percent of latex polymer in the resulting such aqueous system, said latex polymer as formed being stabilized by said alkyd resin.

* * * * *